Patented Jan. 9, 1934

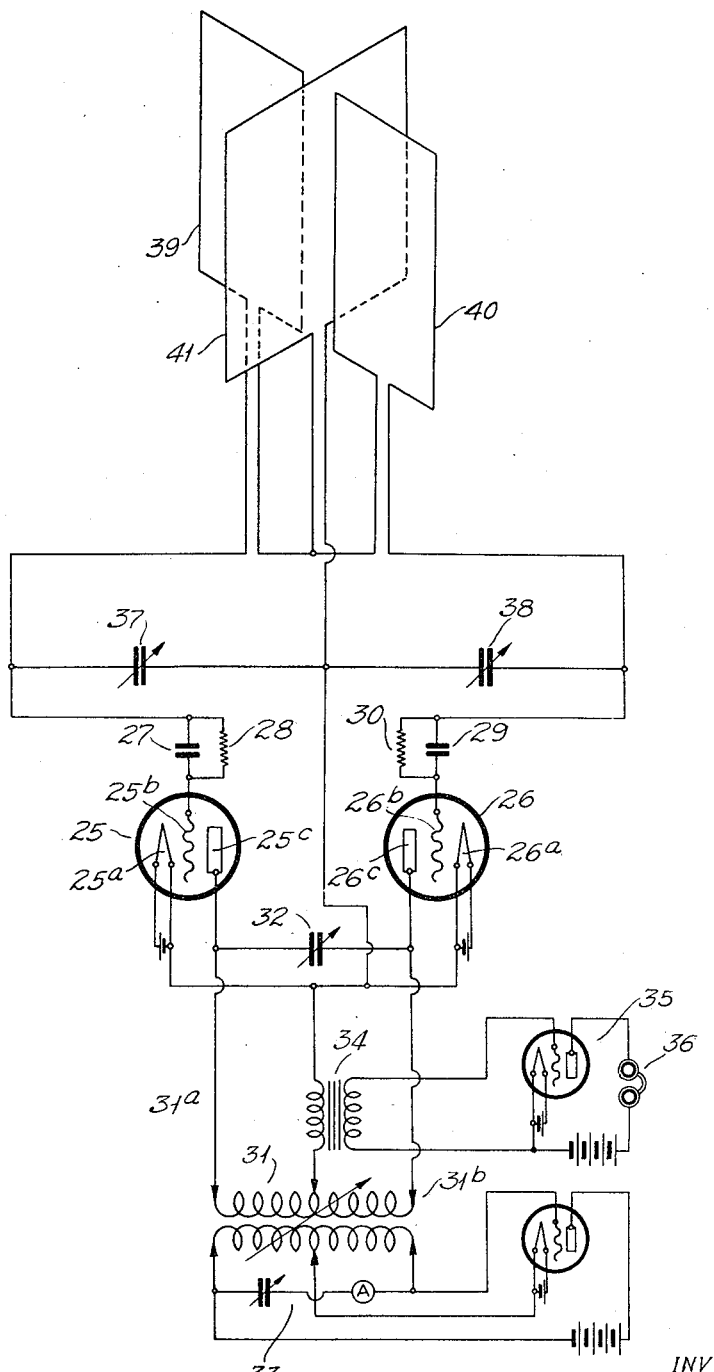

1,942,526

UNITED STATES PATENT OFFICE 1,942,526

RADIO NAVIGATING SYSTEM

John A. Willoughby, Washington, D. C.

Original application January 8, 1929, Serial No. 331,003. Divided and this application July 16, 1932. Serial No. 622,938

6 Claims. (Cl. 250—11)

My invention relates broadly to radio navigation systems and more particularly to a circuit arrangement for an indicator employed in radio navigation systems.

This application is a division of my application Serial No. 331,003, filed January 8, 1929, entitled Radio direction finder.

One of the objects of my invention is to provide a circuit arrangement for an indicator for a radio navigating system which is capable of precision operation for indicating to the navigating pilot the position of the moving vessel with respect to a directively propagated beam.

Another object of my invention is to provide an arrangement of radio frequency pickup circuit for a radio navigating system in which coil antennæ are arranged in predetermined fixed relation and electrically connected with a receiving circuit operative to determine when the vessel is following a directively propagated beam or when the vessel deviates from the predetermined course.

Still another object of my invention is to provide a circuit arrangement for a radio navigating system in which a pair of electron tube circuits are electrically connected with individual coil antennæ through a series path formed by a coil antenna disposed normal to the planes of the aforesaid coil antennæ with means electrically connected with the outputs of the said electron tube circuits for taking successive observations on the coil antennæ for determining the directivity of a propagated signal.

A further object of my invention is to provide a guiding system for moving craft in which signaling energy from a common transmitting station is intercepted by directive collector systems connected to individual receiving systems which are periodically and successively energized and in which energy from the output circuits of the individual receiving systems is impressed upon a common observing circuit for determining when the craft is deviating from its course.

A still further object of my invention is to provide a directive receiving system for radio navigation apparatus in which two co-planar coil antennæ are connected in series and electrically connected with the circuits of an electron tube receiving circuit with an independent coil antenna disposed substantially at right angles to the plane of the co-planar coil antennæ and electrically connected with the electron tube receiving circuits for impressing energy thereon adapted to actuate an indicator to show the position of the vessel equipped with the apparatus with respect to a directively propagated beam.

Other and further objects of my invention reside in the circuit arrangement for a receiving apparatus in a radio navigation system as shown in the accompanying drawing and described in the following specification:

According to this invention a moving craft is equipped with a system employing electron discharge devices which are provided with a plurality of input circuits each of which is provided with a directive collector system or antennæ. Signalling energy transmitted by a certain station in the direction in which the craft is moving is intercepted equally by each of the collector systems when moving in a predetermined course. Each of the electron discharge devices are provided with an output circuit. An arrangement which intermittently and in periodic order energizes the output circuits of the electron discharge devices is in electrical relation with the output circuit and with a common observing circuit. Energy which is successively and periodically modulated in accordance with signaling energy intercepted by each of the collector systems is impressed upon the common observing circuit whereby any deviation from the course by the moving craft is immediately detected. The radio frequency energy pickup circuit employed in the system of my invention comprises two co-planar coil antennæ connected in series and an independent coil antenna substantially at right angle to the planes of the aforesaid coil antennæ. A pair of electron tube circuits have their input circuits electrically connected with the two co-planar coil antennæ through a series path formed by the independent coil antenna. The output circuits of the electron tube systems connect to the indicating system. A power supply system is provided for intermittently and periodically energizing the output circuits of the electron tube systems so that the combined directive effect of the independent coil antenna and one of the co-planar coil antennæ is successively impressed upon the signal indicating system for informing the pilot as to all deviations of the craft with respect to a directively propagated beam.

Referring to the drawing, the reference numerals 25 and 26 designate electron discharge devices having cathode, grid and anode electrodes 25a, 25b, 25c and 26a, 26b, 26c respectively. Grid leak resistance units 28 and 30 and grid condensers 27 and 29 are connected to the grid electrodes of electron discharge devices 25 and 26, respectively. The anode electrodes are connected to the terminals of the inductance 31 which is coupled to the output circuit of a low frequency oscillation generator 33. The frequency of the oscillation generator 33 may be varied in order that the anode circuits of the electron discharge devices 25 and 26 may be alternately energized at any desired rate. Condenser 32 is connected across the inductance 31. The primary winding of the transformer 34 is connected to the cathodes 25a and 26a and the electrical center of the inductance 31. The secondary winding of the transformer 34 is connected to the input of the amplifier 35 in the output circuit of which is connected a telephone set 36 or other indicating device. Loop antennæ or other type of coil antennæ 39, 40 and 41 and condensers 37 and 38 are connected to the input circuits of the electron discharge devices 25 and 26. In operation the electron discharge device 25 receives energy in its input circuit from the loop antennæ 39 and 41 and the electron discharge device 26 receives energy in its input circuit from the loop antennæ 40 and 41. The anode circuit of the device 25 is energized when the terminal 31a of the inductance 31 is positive and energy modulated in accordance with signals intercepted by the antennæ 39 and 41 is impressed upon the amplifier 35 through the transformer 34. When the terminal 31b is positive with respect to the terminal 31a the anode circuit of the electron discharge device 26 is energized and energy modulated in accordance with signals intercepted by the antennæ 40 and 41 is impressed upon the amplifier 35. When the signals heard through the device 36 are continuous then the waves intercepted by the antennæ 39 and 41 and antennæ 40 and 41 are of equal magnitude. When the signals heard through the device 36 are alternately strong and weak then the wave trains intercepted by the antennæ 41 and 39 and antennæ 41 and 40 are of unequal magnitude. When the response obtained from the device 36 is of uniform and unvarying intensity, the signal energy impressed upon the input circuits of both of the electron discharge devices 25 and 26 is substantially equal.

The independent loop antenna 41 provides a series path to the input circuit of electron tube 25 through loop antenna 39. The independent loop antenna 41 also establishes a series path from the input circuit of electron tube 26 through loop antenna 40. The physical disposition of the loops is such that the response of indicator 36 is a maximum when the directively propagated beam is intercepted equally by all of the loops. Loops 39 and 40 have a maximum directional characteristic normal to the maximum directional characteristic of loop 41. The combination of these characteristics however, provides a directional characteristic intermediate the directional characteristics of the normally disposed loops. When the craft on which the loops are mounted is traveling on the propagated beam in a position where the several loops intercept the energy equally, a steady tone is received by the indicator 36. When the loops are displaced on either side of the propagated beam the signals at the indicator 36 are successively strong and weak so that the pilot must so navigate the craft that a steady tone is received at the indicator 36.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a radio navigating system, a system of two co-planar coil antennæ connected in series, an independent coil antenna substantially at right angles to the plane of said first mentioned coil antennæ, two electron tubes each having cathode, anode and grid, balanced input and output circuits therefor, one terminal of each of said co-planar coil antennæ being connected to the cathode of one of said electron tubes respecively, said independent coil antenna being connected to the common connection of said two co-planar coil antennæ and to the grids of said two tubes connected together, a tuning condenser connected between the grid and cathode of each tube, the anodes of said tubes being connected to the respective terminals of one winding of a transformer, the mid-tap of said winding being connected through the primary winding of an output transformer to the cathodes of said tubes, a signal responsive device connected to the secondary of said output transformer, the other winding of said first mentioned transformer being connected to a low frequency generator whereby the variations in signal intensity in said signal responsive device indicate the orientation of said coil antenna system with reference to the direction of an incoming radio wave.

2. In a radio navigation system, a signal receiving circuit including a pair of balanced electron tube circuits, a tuned input circuit for each of said balanced electron tube circuits, a pair of co-planar coil antennæ, an independent coil antenna extending intermediate the aforesaid coil antennæ and normal to the plane thereof, a series path through said independent coil antenna and one of said co-planar coil antennæ to the tuned input circuit of one of said electron tube circuits, a separate series path through said independent coil antenna and the other of said co-planar coil antennæ to the input circuit of the other of said balanced electron tube circuits, and indicator means connected to the output circuits of said balanced electron tube circuits.

3. In a radio navigation system, a pair of balanced electron tube circuits, a tuned input system individual to each of said balanced electron tube circuits, a pair of co-planar coil antennæ, an independent coil antenna extending intermediate said co-planar coil antennæ and normal to the plane thereof, a connection common to each of said tuned input circuits, a connection common to each of said co-planar coil antennæ, said independent coil antenna being bridged across said last mentioned connections, a circuit extending from the opposite terminal of one of said tuned input circuits to one side of one of said co-planar coil antennæ, a connection from the opposite side of the other of said tuned input systems to one side of the other of said co-planar coil antennæ and signal indicator mechanism connected with the output circuits of said balanced electron tube circuits.

4. In a radio navigation system, a pair of balanced electron tube circuits, tuned input systems for each of said balanced electron tube circuits, a set of three coil antennæ, two of said coil antennæ being connected in series and disposed in the same plane with the turns thereof extending substantially edge to edge and having their remote terminals connected to opposite sides of said tuned input systems, said third coil antenna extending in a plane between the adjacent edges of the aforesaid coil antennæ and in a plane normal to the planes thereof, a connection from one side of said third coil antenna to each of said tuned input systems, a connection from the other side of said third coil antenna to a point intermediate the aforesaid two coil antennæ, and signal indicating means connected with the output circuits of said balanced electron tube circuits.

5. In a system of radio navigation, a pair of balanced electron tube circuits each having tuned input systems, terminals for said tuned input systems, a direct connection between adjacent terminals of said tuned input systems, a set of three coil antennæ, two of said coil antennæ being disposed in the same plane with their turns aligned end to end with a gap therebetween and the third of said coil antennæ extending in a plane intermediate the gap between the edges of the aforesaid two coil antennæ, a connection from one side of said third coil antenna to the direct connection between said tuned input systems, a series connected path between said two of said coil antennæ, a connection from said series connected path to the other side of said third coil antenna, connections extending from the opposite terminals of said tuned input systems to the remote terminals of said two coil antennæ, and signal indicator means connected with the output circuits of said balanced electron tube systems.

6. In a radio receiving system, a pair of balanced electron tube systems, an output circuit for each of said electron tube systems, a tuned input circuit connected with each of said electron tube systems, means for successively and alternately energizing the output circuits of said electron tube systems, an indicator circuit common to both of said output circuits, an antenna system connected with said tuned input circuits, said antenna system consisting of a pair of coplanar coil antennæ and an intermediate coil antenna disposed at an angle to the plane of said coplanar coil antennæ, a series path through said intermediate coil antenna and one of said coplanar coil antennæ connected with one of said tuned input circuits, and a separate series path through said intermediate coil antenna and the other of said coplanar coil antennæ connected with the other of said tuned input circuits.

JOHN A. WILLOUGHBY.